Nov. 22, 1955     J. T. BISHOP     2,724,416
PORTABLE POWER RECIPROCATING-BLADE SAW
Filed Sept. 25, 1953     3 Sheets-Sheet 1
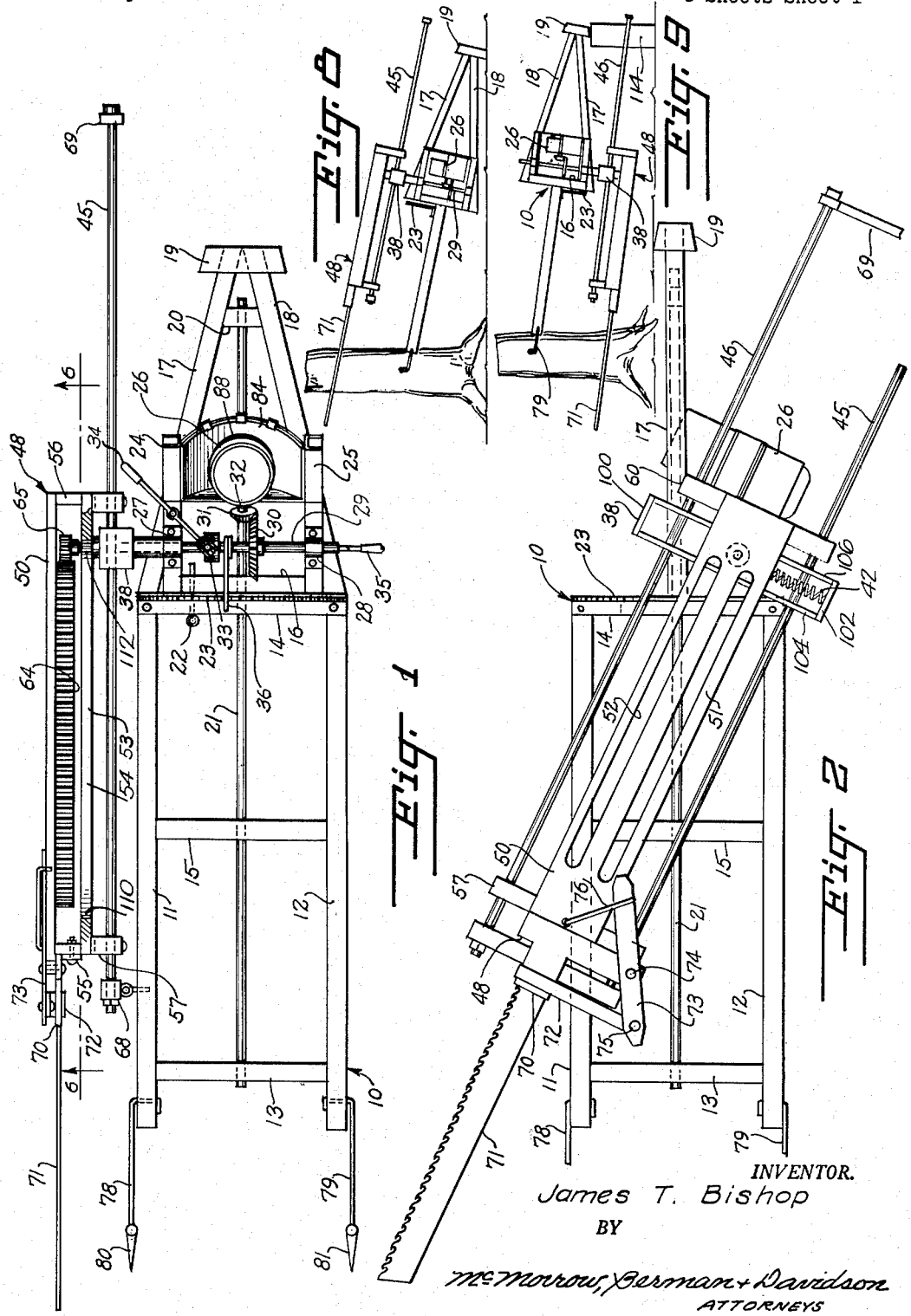
INVENTOR.
James T. Bishop
BY
McMorrow, Berman + Davidson
ATTORNEYS

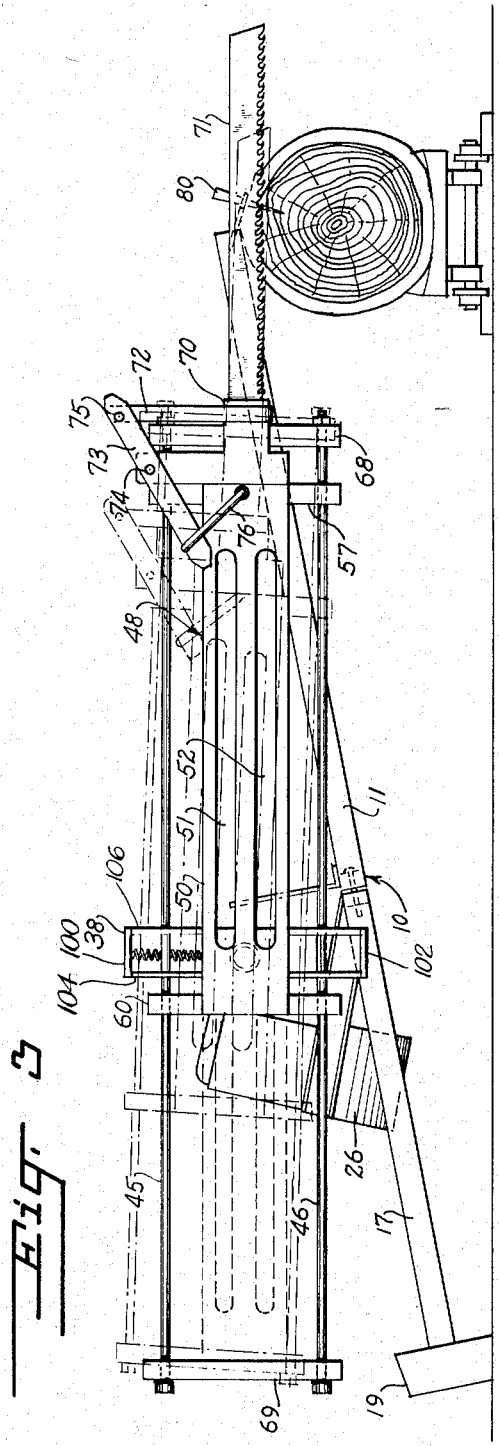
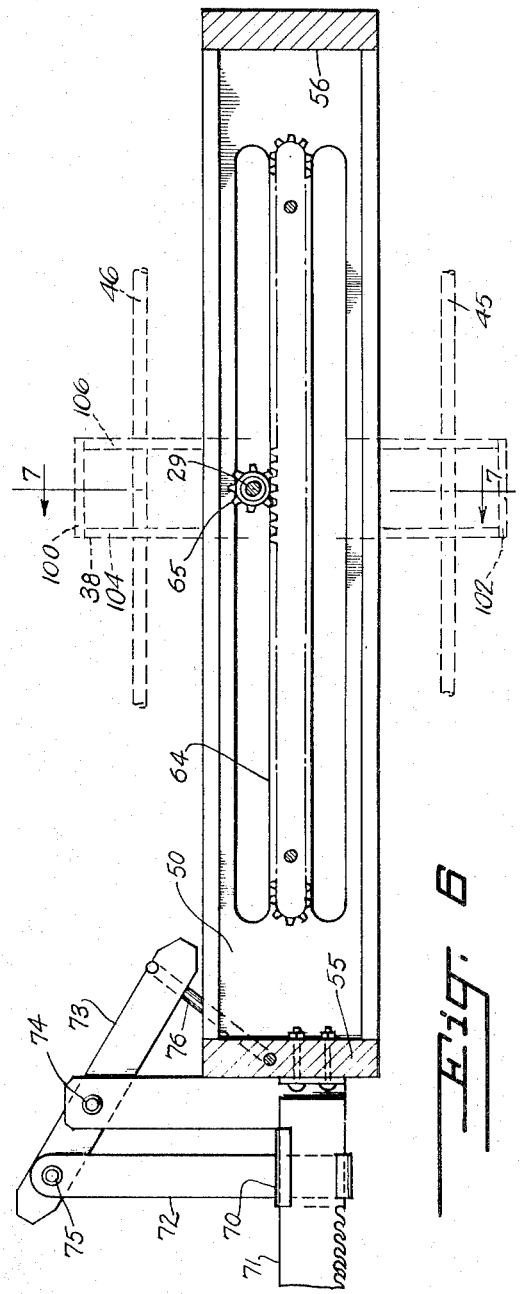

Nov. 22, 1955   J. T. BISHOP   2,724,416
PORTABLE POWER RECIPROCATING-BLADE SAW
Filed Sept. 25, 1953   3 Sheets-Sheet 3
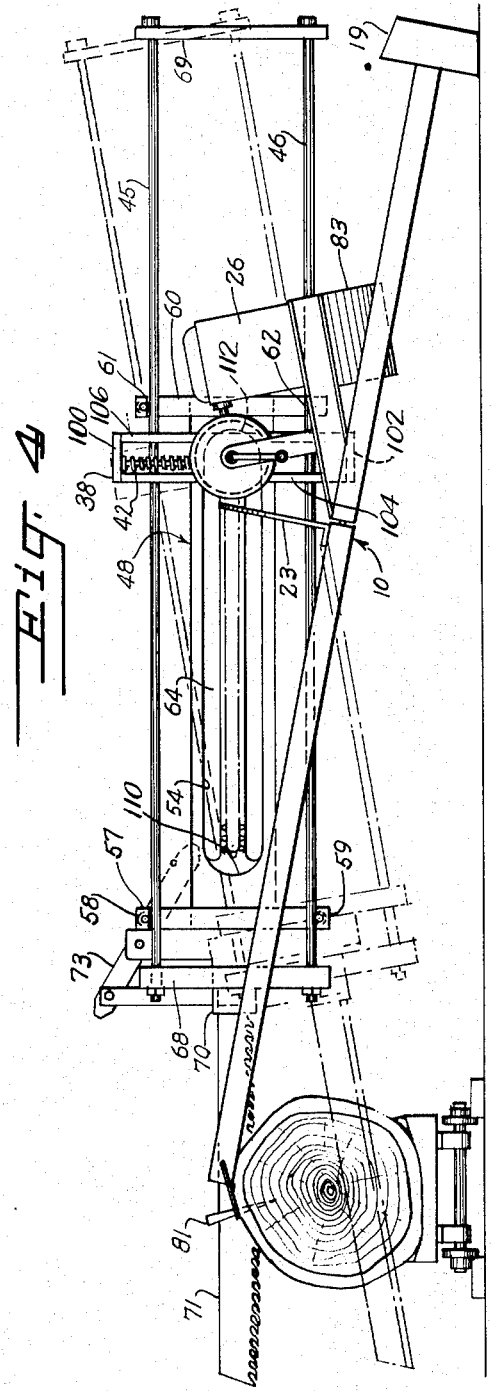
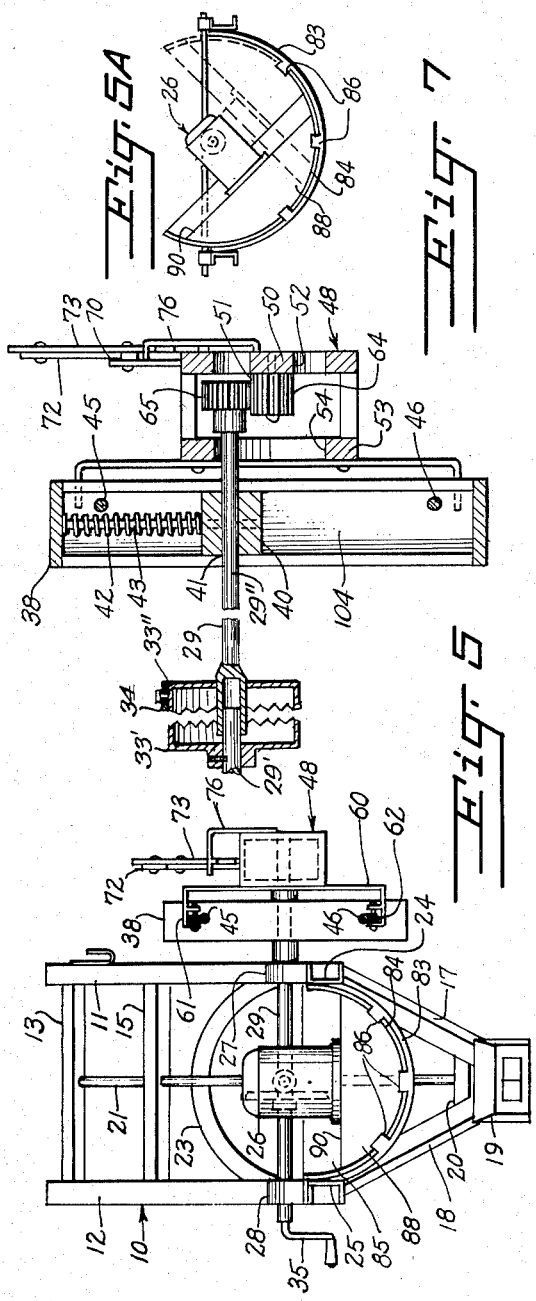
INVENTOR.
James T. Bishop
BY
McMorrow, Berman + Davidson
ATTORNEYS

2,724,416

Patented Nov. 22, 1955

2,724,416

PORTABLE POWER RECIPROCATING-BLADE SAW

James T. Bishop, San Francisco, Calif.

Application September 25, 1953, Serial No. 382,250

4 Claims. (Cl. 143—61)

This invention relates to portable power saw assemblies and more particularly to a power driven reciprocating saw which can be used for felling trees as well as for sawing logs on the ground and for other purposes.

It is among the objects of the invention to provide an improved power driven, portable saw which has an elongated blade and means for reciprocating the blade in the manner of a cross cut saw; which can be easily moved from place to place and set up in selected operating positions for different sawing operations; which can be firmly attached to a tree or log to be cut; and which is easy and safe to use and efficient and effective in operation.

Other objects and advantages will become apparent from a consideration of the following description and the appended claims in conjunction with the accompanying drawings, wherein:

Figure 1 is a top plan view of a portable power saw illustrative of the invention;

Figure 2 is a top plan view of the saw similar to Figure 1, but showing the carriage rotated 90 degrees in a counterclockwise direction as viewed from the back end of the saw;

Figure 3 is a side elevational view of the saw with the saw in inverted position from that illustrated in Figure 2;

Figure 4 is a side elevational view of the saw in operative associaition with a log to be cut by the saw;

Figure 5 is an end elevational view of the saw;

Figure 5A is an elevational view of the motor mounting shown in Figure 5;

Figure 6 (Sheet 2) is a longitudinal cross sectional view on the line 6—6 of Figure 1;

Figure 7 (Sheet 3) is a cross sectional view on the line 7—7 of Figure 6;

Figure 8 (Sheet 1) is a side elevational view of the saw shown in one operative position for felling a tree; and Figure 9 is a side elevational view of the saw in a different tree felling position.

With continued reference to the drawings, the saw comprises a frame, generally indicated at 10, including a main portion of elongated, rectangular shape having spaced apart and substantially parallel side members 11 and 12, end cross members 13 and 14 extending perpendicularly between and secured to the side members near the opposite ends of the latter, and an intermediate cross member 15 extending between and secured to the side members between the end members 13 and 14. The frame further includes an extension including an end cross member 16 disposed adjacent to the end cross member 14 and having a length substantially equal to the length of the latter and side members 17 and 18 converging symmetrically from the opposite ends of the cross member 16 to the ends of the side members remote from this cross member. A shoe 19 is mouned on the side members 17 and 18 at the ends of these side members remote from the rectangular portion of the frame and from the extension cross member 16 and an intermediate cross member 20 extends between and is secured to the side members 17 and 18 adjacent the shoe 19. The cross members 13, 15, 14, 16 and 20 are provided with centrally located apertures and a shaft 21 extending through the apertures in the several cross members pivotally connects the frame extension to the rectangular shaped portion of the frame for rotational movement of the extension relative to the rectangular frame portion about the axis of the shaft 21. The cross members 14 and 16 are provided with mutually registering apertures spaced from the shaft 21 and a locking pin 22 is inserted through these apertures to restrain the extension against rotational movements relative to the rectangular portion of the frame, this pin being removable to provide freedom of rotational movement of the extension relative to the remainder of the frame when desired.

A flat arch member 23 of substantially semi-circular shape extends transversely of the rectangular portion of the frame and perpendicularly from the frame at the end of the frame at which the end member 14 is located and has its ends secured to the end member 14 at the opposite ends of the latter and brackets 24 and 25 in the form of short struts are mounted on the frame extension at the wider end of the extension in spaced apart and substantially parallel relationship to each other and in inclined position relative to the side members 17 and 18 of the frame extension and a portable power plant 26, such as an electric motor or a small gasoline engine, is mounted on a cradle 83 carried between the struts 24 and 25 at a location spaced from the cross member 16 of the frame extension.

The cradle 83 is a flat, relatively wide strip of sheet material of suitable gauge formed arcuately so that it extends below the struts 24 and 25. The cradle 83 is secured at its opposite ends by any suitable means to the respective struts 24 and 25 between which the cradle is carried.

A semi-circular carrier 84 is mounted on the cradle 83 and is adapted to move in an arcuate path on the cradle 83. Carrier 84 is likewise formed of sheet material of substantially the same width as the material from which the cradle 83 is formed, and is in overlying relation contacting the inner surface of the cradle 83. A flat, semi-circular back plate 85 is provided for the carrier 84, the arcuate portion of the back plate 85 being secured along one peripheral edge of the carrier 84 remote from the free ends of the struts 24 and 25 and disposed diametrically across this one end of the carrier 84. A plurality of fingers 86 carried along one peripheral edge of the cradle 83 are adapted to overlie the arcuate portion of the carrier 84 along the one peripheral edge remote from the back plate 85 so that the carrier 84 will be capable of rotational movement within the cradle 83 as shown in Figure 5A. A motor block or pad 88 is secured centrally within the carrier 84 and has an arcuate surface corresponding to the arcuate portion of the carrier 84 and a flat surface 90 extending chordally across the arcuate portion of the carrier 84. The motor or engine 26 is centrally mounted upon the flat surface 90 of the motor pad 88. In effect, the power plant or motor 26 is carried by the cradle 83, and since the carrier 84 is rotatable in an arcuate path relative to the cradle 83, the motor 26 may be placed in any inclined position relative to the struts 24 and 25 and consequently the frame extension. As shown in Figure 5A, the motor 26 may be rotated on the carrier 84 in a clockwise direction from the central position shown in Figure 5 or may be rotated in a counter-clockwise direction as shown in broken lines in Figure 5A, so that the axis of inclination of the motor or engine 26 is limited only by the extent of movement in its arcuate path of the carriage 84.

Journal blocks 27 and 28 are mounted on the struts 24 and 25 between the power plant 26 and the end member 16 of the frame extension and a two-part drive shaft 29 extends through and is journaled in these bearing blocks and is disposed transversely of the frame extension and substantially parallel to the end member 16 of the frame extension the two sections of the shaft 29 being indicated at 29' and 29" respectively. See Figure 7.

A beveled gear 30 is mounted on the drive shaft 29 between the bearing blocks 27 and 28 and a complementary beveled gear or pinion 31 is mounted on the engine drive shaft 32 and meshes with the beveled gear 30 to drive this gear. The gear 30 is mounted for rotation with the drive shaft 29. A manually operable clutch 33 of conventional design, as shown in Figure 7, is interposed between the shaft sections 29' and 29" so that the clutch parts 33' and 33" can be brought into operative engagement to impart rotation from the shaft section 29' and to the shaft section 29" upon selective operation of the hand lever 34 carried by the clutch part 33" associated with the shaft section 29". Thus, rotation imparted to the shaft section 29' by the engine or power plant drive shaft 32 can be transmitted to the shaft section 29" or the shaft section 29" can be disconnected therefrom, as desired. A hand crank 35 is mounted on one end of the drive shaft 29 for cranking the engine 26, and a spring lever 36 has a looped portion receiving the shaft 29, one end bearing against the cross member 16 of the frame extension and its other end engaging the inner edge of the arch structure 23 to releasably hold the frame extension in selected positions of rotational adjustment relative to the rectangular shaped portion of the frame when the locking pin 22 is withdrawn, the arch structure preferably being provided along its inner edge with spaced apart notches in which the corresponding end of the spring lever 36 engages.

A guideway structure 38 of elongated rectangular shape having spaced parallel top and bottom walls 100 and 102 and spaced parallel end walls 104 and 106 extending between the top and bottom walls at opposite ends thereof is disposed at one side of the frame extension and the drive shaft section 29' extends through this guideway structure. The slide block 40 is slidably mounted between the opposite end walls 104 and 106 in the guideway structure 38. The slide block is provided with a bore 41 through which the drive shaft 29, specifically the drive shaft section 29", extends with the drive shaft being freely rotatable. A compression and tension spring 42 is interposed between the block 40 and the top wall 100 of the guideway structure 38 with the spring 42 secured at one end to the block 40. A spring guide 43 extends from the top wall of the guideway structure through the spring 42 and into the block 40, as shown in Figure 7.

A pair of guide rails or bars 45 and 46 are secured intermediate their ends in the end walls 104 and 106 and extend through the guideway structure one near each end of this structure and are disposed in spaced apart and parallel relationship to each other. These guide rails are substantially parallel to the frame shaft 21 and extend substantially equal distances to the opposite sides of the guideway structure 28, being disposed perpendicular to the guideway structure and at right angles to the drive shaft 29.

A carriage, generally indicated at 48, having a length substantially equal to one half the length of the guide rails 45 and 46 extends longitudinally of and is slidably mounted on the guide rails for reciprocatory movements along the guide rails. This carriage comprises a rectangular frame including an outer plate 50, preferably provided with parallel, longitudinally extending slots 51 and 52 for decreasing the weight of the plate, an inner plate 53 parallel to the outer plate 50 and having therein a longitudinally extending opening 54 having the opposite ends 110 and 112 thereof formed arcuately, the opening 54 occupying the major portion of the area of this plate and spacer numbers 55 and 56 disposed between and secured to the plates 50 and 53 at the respectively opposite ends of the carriage frame. The shaft section 29" of the shaft 29 extends through the opening 54 and into the frame of the carriage 48.

A strut 57 extends transversely of the carriage frame at the end of the frame adjacent the spacer 55 and beyond the longitudinal edges of the frame and carries peripherally grooved rollers 58 and 59 engaged with the guide rails 45 and 46 respectively. A similar strut 60 extends transversely of the carriage frame at the end of this frame adjacent the spacer 56 and carries at its opposite ends rollers 61 and 62 which slidably engage the guide rails 45 and 46, the struts 57 and 60 maintaining the carriage on the guide rails for movement longitudinally of the guide rails.

An elongated bar 64 is mounted on the carriage frame plate 50 at the side of this plate adjacent the plate 53 and between the slots 51 and 52 and has geared teeth extending transversely thereof along its sides disposed perpendicular to the adjacent surface of the carriage frame plate 50 and around the ends thereof, this bar having a length equal to the major portion of the length of the carriage 48. The drive shaft section 29" extending through the block 40 and into the carriage frame has spur gear 65 mounted on the end of the drive shaft section 29" within the carriage frame and has gear teeth which mesh with the teeth of the toothed bar 64.

With the teeth of the gear 65 engaged with the teeth of the bar 64 and assuming that the gear 65 is at one end of the bar 64, as the gear 65 is rotated in the appropriate direction, the bar will be moved longitudinally past this gear until the gear comes to the other end of the bar at which time the gear will move around the end of the bar and engage the teeth on the opposite side of the bar. With continued rotation of the gear the bar will now move in the opposite direction past the gear until the gear reaches the opposite end of the bar at which time it will run around this opposite end and move the bar back thereby imparting a reciprocatory movement to the carriage 48 along the guide rails 45 and 46. It will be seen that the guideway 38 and the carriage 48 can move transversely of the shaft 29 as the gear 65 follows along the gear toothed periphery of the bar 64 from one longitudinal edge of the bar to the other longitudinal edge thereof The spring 42 acts as a compression spring providing resilient pressure on the shaft section 29" to urge the gear 65 into mesh with the gear teeth on the bar 64 when the gear 65 is on the upper longitudinal side or edge of the bar, as viewed in Figure 7. When the gear 65 moves to one end of the bar 64, the adjacent arcuate end, 110 or 112, as the case may be, of the opening 54 will serve as a guide track to prevent the bar 64 from running off the gear 65 and guide the gear about the teeth on the end of the bar. As the gear travels along the lower longitudinal edge of the bar, as viewed in Figure 7, the spring 42 will act as a tension spring providing resilient pressure on the shaft section 29" to maintain the gear 65 in mesh with the gear teeth of the bar 64.

A spacer strut 68 extends between and is secured to the guide rails 45 and 46 at one end of the guide rail assembly and a similar spacer strut 69 extends between and is secured to the guide rails at the opposite end of the assembly, the struts 68 and 69 serving as abutments to limit movements of the carriage 48 longitudinally of the guide rails and prevent the carriage from accidentally moving off of the guide rails at either end of the guide rail assembly and, together with the guideway structure 38, maintaining the guide rails in spaced apart and parallel relationship to each other.

A socket 70 is mounted on one end of the carriage 48 and projects outwardly from the corresponding end of the carriage longitudinally of the carriage and an elongated saw blade 71 has one end received in the socket 70 and extends longitudinally from the carriage. A saw clamping link 72 extends partly around and perpendicularly from the socket 70 and a lever 73 pivotally mounted intermediate its length on the carriage frame, as indicated at 74, is pivotally connected at one end to the end of the clamp arm 72 remote from the socket 70, as indicated at 75. A latch 76 is pivotally mounted at one end on the carriage frame and is engageable at its other end with the lever 73 near the end of the lever remote from the pivotal connection 75 to hold the clamp arm 72 in position to securely clamp the saw blade 71 in the socket 70.

Extension arms 78 and 79 are pivotally secured, each at one end, to the frame side members 11 and 12 at the end of the frame 10 remote from the frame extension and extend outwardly from the ends of the corresponding frame members. A spike 80 is pivotally connected to the distal end of the extension arm 78 and a similar spike 81 is pivotally connected to the distal end of the extension arm 79, these spikes being insertable into a tree or log which is to be cut by the saw to hold the saw frame rigidly in position while the saw is moved back and forth transversely of the tree or log to cut the latter.

When the saw is to be used to cut through a log disposed in substantially horizontal position, as illustrated in Figure 4, the frame extension is turned to the position at which the end member 16 of the frame extension is parallel to the adjacent end member 14 of the rectangular portion of the frame and the locking pin 22 is inserted to maintain the frame extension in this position relative to the remainder of the frame. The end of the rectangular portion of the frame remote from the frame extension is then placed on top of the log and the spikes 80 and 81 are driven into the log, the shoe 19 of the frame extension resting on the ground at the opposite end of the frame. The saw blade 71 is then positioned so that its teeth are at its bottom edge and the blade extends transversely across the log to be cut. With the power plant in operation, the clutch 33 is then engaged and the saw carriage and saw will be moved back and forth in a reciprocating manner so that the saw will cut transversely through the log. When the saw is used in this position, it is not necessary to apply any pressure to the power blade as the weight of the blade and the adjacent end of the carriage will be sufficient to apply the necessary cutting pressure to the blade. When the saw is to be used for felling a standing tree, it may be placed in either of the operative positions shown in Figures 8 and 9, the position shown in Figure 8 being the operative position of the saw for cutting a high stump and the position shown in Figure 9 being the operative position of the saw for cutting a low stump, with a pedestal, frame or other suitable support 114 supporting the shoe 19 above the ground surface, so as to provide sufficient clearance for the carriage as it is reciprocated.

For felling a standing tree, the ends of the frame side members 11 and 12 to which the arms 78 and 79 are connected are disposed at respectively opposite sides of the tree and the spikes 80 and 81 are driven into the tree to secure this end of the frame to the tree with the frame inclined downwardly in a direction away from the tree. The shoe 19 at the other end of the frame rests on the ground and the frame extension is rotated relative to the rectangular portion of the frame to a position at which the end member 16 of the frame extension is perpendicular to the adjacent frame end member 14, the locking pin 22 being withdrawn and the frame extension being secured in the selected position of rotational adjustment relative to the remainder of the frame by the engagement of the spring lever 36 with the arch member 23. If the tree is to be cut with a high stump, as illustrated in Figure 8, the frame extension is turned relative to the remainder of the frame in a direction to place the saw carriage above the frame and, if the tree is to be cut with a low stump, the frame extension is rotated in a direction to place the saw carriage below the frame and, in this latter case, the ends of the guide rails 45 and 46 adjacent the shoe 19 will rest on the pedestal 114 supporting the shoe somewhat above the ground, as illustrated in Figure 9. With the saw positioned as described above and with the power plant in operation and the clutch 33 engaged to reciprocate the saw blade, it will be necessary to apply manual pressure to the end of the guide rail assembly nearest the tree to force the saw into cutting engagement with the tree. In order to avoid danger to the operator, when the tree has been cut through to a predetermined extent, the saw will be removed and the remainder of the felling operation carried out with an ax or other tool in a well known manner.

Of course, it will be appreciated that in the event that the power plant 26 is a gasoline engine, the motor must be maintained in an upright position in order to operate. Since, as previously described, and as shown in Figure 5A, the power plant 26 is movable about its drive shaft 32 as an axis by the rotation of the carrier 84 in its arcuate path either clockwise or counterclockwise, the power plant 26 may be so positioned to be selectively rotating the carrier 84 that the power plant 26 will remain upright when the saw is employed as shown in either Figure 8 or 9. In this latter regard, it should be noted, that the drive shaft 32 being the axis about which the power plant 26 is rotatable to selective tilting position, the gear 31 will continue to mesh with the gear 30 regardless of the rotated position of the power plant 26.

The invention may be embodied in other specific forms without departing from the spirit or essential characteristics thereof. The present embodiment is, therefore, to be considered as illustrative and not restrictive in all respects, the scope of the invention being indicated by the appended claims rather than by the foregoing description, and all changes which come within the meaning and range of equivalency of the claims are, therefore, intended to be embraced therein.

What is claimed is:

1. A portable saw assembly comprising an elongated frame, a drive shaft journalled on and extending transversely of said frame, power means mounted on said frame and drivingly connected to said drive shaft, a guideway structure mounted on said drive shaft at one side of said frame and disposed perpendicular to said drive shaft, means providing a resiliently resisted freedom of movement of said guideway structure transversely of said shaft, parallel guide bars mounted on said guideway structure disposed at right angles to said drive shaft and to the guideway structure, a carriage mounted on said guide bars for movement longitudinally thereof and having a saw mounting socket structure at one end, an elongated saw blade engaged at one end in said socket structure and extending longitudinally from said carriage, an elongated bar mounted on and extending longitudinally of said carriage and having transversely extending gear teeth along opposite sides and around the ends thereof, and a gear mounted on said drive shaft and having teeth meshing with the gear teeth on said bar to impart reciprocatory movement to said carriage along said guide bars.

2. A portable saw assembly comprising an elongated frame, a drive shaft journalled on and extending transversely of said frame, power means mounted on said frame and drivingly connected to said drive shaft, a guideway structure mounted on said drive shaft at one side of said frame and disposed perpendicular to said drive shaft, means providing a resiliently resisted freedom of movement of said guideway structure transversely of said shaft, parallel guide bars mounted on said guideway structure disposed at right angles to said drive shaft and to the guideway structure, a carriage mounted on said guide bars for movement longitudinally thereof and having a saw mounting socket structure at one end, an elongated saw blade engaged at one end in said socket structure and extending longitudinally from said carriage, an elongated bar mounted on and extending longitudinally of said carriage and having transversely extending gear teeth along opposite sides and around the ends thereof, and a gear mounted on said drive shaft and having teeth meshing with the teeth on said bar to impart reciprocatory movement to said carriage along with guide bars, said frame including a main portion, a frame extension extending longitudinally from one end of said main portion, and means pivotally connecting said extension to said main portion for rotational movements of adjustment of the former relative to the latter about an axis extending longitudinally and medially of said main portion and said extension.

3. A portable power saw assembly comprising a frame including a main portion and an extension extending from one end of said main portion and pivotally connected to the latter for rotational movements relative to said first portion about an axis extending longitudinally of said first portion and said extension, an elongated guideway structure disposed at one side of said extension, a drive shaft journalled on and extending transversely of said extension and through said guideway structure substantially perpendicular to the latter, means providing a resiliently resisted freedom of transverse movement of said guideway structure relative to said drive shaft and to the guideway structure, a guide rail assembly carried by said guideway structure disposed at right angles to said drive shaft, a carriage mounted on said guide rail assembly for movement longitudinally of the latter, means connecting said drive shaft to said carriage imparting reciprocatory motion to said carriage along said guide rail assembly upon unidirectional rotation of said drive shaft, and a saw blade atached at one end to one end of said carriage and projecting from said carriage longitudinally thereof.

4. A portable saw assembly comprising an elongated frame, a drive shaft journaled on and extending transversely of said frame, power means mounted on said frame and drivingly connected to said drive shaft, a guideway structure mounted on said drive shaft at one side of said frame and disposed perpendicular to said drive shaft, means providing a resiliently resisted freedom of movement of said guideway structure transversely of said shaft, parallel guide bars mounted on said guideway structure disposed at right angles to said drive shaft, a carriage mounted on said guide bars for movement longitudinally thereof and at a right angle to the motion of the guideway structure and having a saw mounting socket structure at one end, an elongated saw blade engaged at one end in said socket structure and extending longitudinally from said carriage, an elongated bar mounted on and extending longitudinally of said carriage and having transversely extending gear teeth along opposite sides and around the ends thereof, and a gear mounted on said drive shaft and having teeth meshing with the teeth on said bar to impart reciprocatory movement to said carriage along with guide bars, said frame including a main portion, a frame extension extending longitudinally from one end of said main portion, and means pivotally connecting said extension to said main portion for rotational movements of adjustment of the former relative to the latter about an axis extending longitudinally and medially of said main portion and said extension, carrier means carried by said frame extension for movement in an arcuate path about an axis medially and longitudinally of said extension, and power means for imparting rotation to said shaft mounted on said carrier means for movement therewith to permit said power means to be selectively moved to an upright position when said extension is rotated to a selected position of adjustment relative to said frame main portion.

References Cited in the file of this patent

UNITED STATES PATENTS

| 561,587 | Hillebrand | June 9, 1896 |
| 977,028 | Maxwell | Nov. 29, 1910 |
| 1,225,531 | Twombly | May 8, 1917 |
| 1,300,650 | Reierson | Apr. 15, 1919 |
| 1,329,671 | Mickey | Feb. 3, 1920 |
| 1,441,747 | Perkins | Jan. 9, 1923 |
| 1,489,387 | Fosberg | Apr. 8, 1924 |
| 2,554,220 | Stennitt | May 22, 1951 |

FOREIGN PATENTS

| 122,918 | Australia | Nov. 26, 1946 |